(12) United States Patent
Gohil et al.

(10) Patent No.: US 8,742,029 B2
(45) Date of Patent: Jun. 3, 2014

(54) COPOLYESTER BLENDS WITH IMPROVED MELT STRENGTH

(71) Applicant: E I du Pont de Nemours and Company, Wilmington, DE (US)

(72) Inventors: Rameshchandra M Gohil, Newark, DE (US); Yuefei Tao, Hockessin, DE (US); Mark F Teasley, Landenberg, PA (US); Lech Wilczek, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 13/729,357

(22) Filed: Dec. 28, 2012

(65) Prior Publication Data

US 2013/0172456 A1    Jul. 4, 2013

Related U.S. Application Data

(60) Provisional application No. 61/580,836, filed on Dec. 28, 2011.

(51) Int. Cl.
*C08G 63/91*    (2006.01)

(52) U.S. Cl.
USPC ............ 525/411; 525/415; 525/448; 525/450

(58) Field of Classification Search
USPC .................................. 525/411, 415, 448, 450
See application file for complete search history.

(56) References Cited

U.S. PATENT DOCUMENTS

| | | |
|---|---|---|
| 2007/0128459 A1 * | 6/2007 | Kurian et al. ................. 428/480 |
| 2010/0168336 A1 | 7/2010 | Cohoon-Brister |
| 2011/0039999 A1 | 2/2011 | Witt et al. |
| 2011/0071235 A1 | 3/2011 | Kannan et al. |
| 2011/0187029 A1 | 8/2011 | Dietrich et al. |

FOREIGN PATENT DOCUMENTS

WO    WO 2010034710 A1 *    4/2010

* cited by examiner

*Primary Examiner* — Robert Jones, Jr.

(57) ABSTRACT

Blends comprising 65-95 wt % poly(trimethylene terephthalate-co-sebacate), 5 to 35 wt % polylactic acid and a chain extender are provided that exhibit greatly increased melt strength compared to that of poly(trimethylene terephthalate-co-sebacate) alone. Such improvements allow these compositions to be processed readily by melt-blowing, which is useful for packaging and for preparing items such as biodegradable garbage bags.

6 Claims, No Drawings sequences # COPOLYESTER BLENDS WITH IMPROVED MELT STRENGTH

FIELD OF THE INVENTION

The present invention is directed to copolyester blends with improved melt strength. The copolyester blends are suitable for a variety of applications, particularly packaging.

BACKGROUND

Emerging environmental trends aimed at reducing greenhouse gas emissions, use of fossil carbon derivatives, and solid waste accumulation have created a growing desire to replace petroleum-based polyesters such as poly(ethylene terephthalate) ("PET") with renewably-sourced materials and modifiers, particularly for applications such as packaging. Current commercial offerings include, for example, poly (trimethylene terephthalate), polylactic acid, polyhydroxyalkanoates, starch, and poly(butylene terephthalate-co-adipate). However, these products generally have inadequate mechanical properties, such as tear strength, for applications such as packaging. In addition, melt viscosity and melt strength are often too low for processing methods used in manufacturing packaging materials, such as melt-extrusion, film-blowing, and blow-molding.

Starch-containing compositions have been used to provide biodegradable resin compositions useful for manufacture of shaped articles such as rigid sheets, flexible films, or molded articles. For example, U.S. Pat. No. 5,043,196 discloses compositions that contain starch compounded into various water soluble polymers. "Thermoplastic starch" compositions using biodegradable polymers as melting aids have been disclosed in U.S. Pat. No. 6,235,815. Blends of starch with copolyesters (e.g., "3GTX" made from monomers comprising 1,3-propanediol ("3G"), terephthalic acid ("T"), and a linear aliphatic dicarboxylic acid ("X")) can exhibit low bubble stability in film-blowing because of the low melt strength of the copolyester. Also, incomplete dispersion of the starch can lead to inadequate mechanical properties.

The capability to make a compostable polyester copolymer composition from one or more bio-sourced monomers that has adequate properties for packaging applications could significantly reduce the environmental footprint (i.e., non-renewable energy consumption and greenhouse gas emissions) of plastic bags. The present invention is directed to providing bio-compostable, and preferably bio-sourced, polyester copolymer blends with improved melt strength.

SUMMARY OF THE INVENTION

One aspect of the present invention is a blend comprising 65-95 wt % poly(trimethylene terephthalate-co-sebacate), 5 to 35 wt % polylactic acid, and 0.01-0.10 wt % chain-extender, based on the combined weight of the poly(trimethylene terephthalate-co-sebacate) and polylactic acid.

DETAILED DESCRIPTION

As used herein, the term "blend" refers to an intimate mixture on a molecular level, such as is formed when molten resins are compounded using, for example, an extruder.

As used herein, the term "(co)extrusion" encompasses both extrusion and co-extrusion.

As used herein, the term "3GT" denotes poly(trimethylene terephthalate).

As used herein, the term "3GTX" denotes poly(trimethylene terephthalate-co-X), where X is derived from a linear aliphatic dicarboxylic acid.

As used herein, the term "packaging" means either an entire package or a component of a package.

As used herein, the term "acid equivalent" means compounds that perform substantially like the specific acid in reaction with polymeric glycols and diols.

As used herein, the term "starch" refers to a polysaccharide carbohydrate consisting of a large number of glucose units joined together by glycosidic bonds produced by essentially any green plant. "Thermoplastic starch" does not contain or require a plasticizer. Starch whose processability is significantly enhanced by a plasticizer is referred to here as "non-thermoplastic starch."

As used herein, the term "high amylose starch" refers to any starch with an amylose content of at least 45%, and preferably at least 65% by weight.

As used herein, the term "melt blend" (blending, blends, blended) refers to a material prepared by intimately mixing molten materials.

Disclosed herein are compositions comprising poly(trimethylene terephthalate-co-sebacate) ("3GTX") and polylactic acid in a 3GTX:PLA weight ratio between about 98:2 and about 50:50, having physical properties suitable for packaging and other applications.

Poly(Trimethylene Terephthalate-Co-Sebacate) Copolyesters

Poly(trimethylene terephthalate-co-sebacate) is an attractive component for use in packaging applications, particularly for trash bags or other disposable packaging, as it decomposes in compost within a few weeks or in soil without leaving any residues. In addition, 3GTX can be considered a sustainable product because it can be derived at least in part from renewably-sourced materials: 1,3-propanediol, which can be derived from a biological source via a fermentation process, and sebacic acid, which can be derived from castor oil.

3GTX is an aliphatic-aromatic copolyester. It is made by polycondensation of terephthalic acid or acid equivalent ("T"), sebacic acid or acid equivalent ("X"), and 1,3-propanediol ("3G"). As used herein, the term "acid equivalent" means compounds that perform substantially like the specific acid in reaction with polymeric glycols and diols. Terephthalic acid equivalents for the purpose of the present disclosure include, for example, esters (such as dimethyl terephthalate), and ester-forming derivatives such as acid halides (e.g., acid chlorides) and anhydrides. The 1,3-propane diol is preferably of the type that is obtained biochemically from a renewable source ("biologically-derived" 1,3-propanediol). The polycondensation is carried out using conventional means, for example, as disclosed in U. Witt et al., *Macromolecular Chemistry and Physics*, 195, 793-802 (1994) for the preparation of polyesters based on terephthalic acid or acid equivalent, 1,3-propanediol, and aliphatic dicarboxylic acid or acid equivalent. Alternatively, the composition may be prepared by transesterification of poly(trimethylene terephthalate) ("3GT") with sebacic acid or acid equivalent.

The copolyester used in the compositions disclosed herein is based on 3G, T, and X in a molar ratio 3G:T:X of 50: 49-1: 1-49. This can be represented as the formula:

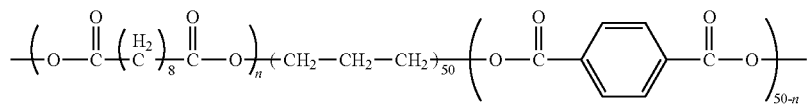

wherein n is about 1 to about 49. In some embodiments, n can be between and optionally include any two of the following values: 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, and 49. In an embodiment, n is 5 to 45. In another embodiment, n is 10 to 40. In a further embodiment, n is 15 to 35.

Preferably, the 1,3-propanediol used as a reactant or as a component of the reactant in making poly(trimethylene terephthalate) and poly(trimethylene terephthalate) copolymers will have a purity of greater than about 99%, and more preferably greater than about 99.9%, by weight as determined by gas chromatographic analysis. Particularly preferred are the purified 1,3-propanediols as disclosed in U.S. Pat. Nos. 7,038,092, 7,098,368, 7,084,311 and U.S. Patent Application No. 20050069997A1.

Purified 1,3-propanediol preferably has the following characteristics:

(1) an ultraviolet absorption at 220 nm of less than about 0.200, and at 250 nm of less than about 0.075, and at 275 nm of less than about 0.075; and/or (2) a composition having a CIELAB "b*" color value of less than about 0.15 (ASTM D6290), and an absorbance at 270 nm of less than about 0.075; and/or (3) a peroxide composition of less than about 10 ppm; and/or (4) a concentration of total organic impurities (organic compounds other than 1,3-propanediol) of less than about 400 ppm, more preferably less than about 300 ppm, and still more preferably less than about 150 ppm, as measured by gas chromatography.

Polylactic Acid

Polylactic acid (referred to herein as "PLA") is an aliphatic polyester made up of lactic acid (2-hydroxy propionic acid) building blocks. PLA that is derived from renewable resources such as corn starch, tapioca products or sugar cane provides desired renewably-sourced content to the polymer. Further, PLA has high melt strength.

Melt Properties of 3GTX/PLA Blends

Aromatic polyesters (e.g., PET) and aromatic-aliphatic polyesters (e.g., 3GTX), generally have low melt viscosities and melt strength because of the limits to which their molecular weights can be raised, and because many of them are crystalline and have high melting points. Melt processing is carried out at temperatures at least close to or above the melting point, and viscosity is thereby reduced. High melt strength is very important for extrusion processing and particularly for melt-blowing and blow-molding. 3GTX by itself lacks sufficient melt strength at the processing temperatures that are typically used for extrusion, film-blowing, and blow-molding.

Extensional properties play an important role in some processes such as melt-spinning, blow-molding and film-blowing. Melt strength is a property of the polymer melt which indicates its ability to withstand drawing without breaking. It equals the maximum draw-down ratio times the melt tension. The measurement of melt tension mimics an industrial spinning process. A fluid is pressed or extruded through a round-hole die, the resulting thread is hauled off with increasing speed, and the applied extensional force is measured. The force is recorded as a function of haul-off speed or draw-down ratio, which is the ratio of the haul-off speed to the initial speed. Melt strength is then defined as a force at filament break, while drawability can be estimated qualitatively from the maximum draw-down ratio at the failure. High melt strength can result in good bubble stability in film-blowing. Measurements of melt strength can depend not only on the polymer composition, but also on the geometry of the die in the testing instrument (e.g., a capillary rheometer) and the experimental conditions. As a result, it may not be appropriate to compare absolute numerical results obtained on polymers of different chemical composition, even if the same die and experimental conditions are used.

Melt index ("MI"), also referred to as Melt Flow Rate, is a measure of the ease of flow of the melt of a thermoplastic polymer. It is a low-shear method that gives some indication of a polymer's melt processing properties. It is defined as the mass of polymer, in grams, flowing in ten minutes through a capillary of a specific diameter and length by a pressure applied via prescribed alternative gravimetric weights for alternative prescribed temperatures. The method is described in the standards ASTM D1238 and ISO 1133. A melt index between about 2 g/10 min and about 4 g/10 min at the specified temperature and load (for example, 190° C. and 2.16 kg load for compositions disclosed herein) is desirable for melt processability in commercial film blowing machines. For a given 3GTX chemical composition, the melt index can vary with the molecular weight of the polymer and the degree of branching. Increasing the MI of 3GTX decreases the melt tension and increases maximum draw-down ratio ("max draw") at failure, resulting in almost no change in melt strength.

Polymer melt strength can often be improved by the presence of high molecular weight tails or long-chain branches, as is the practice in the polyethylene industry. However, the present inventors have observed that the melt strength of 3GTX is not effectively improved by simply increasing molecular weight (thereby decreasing MI) or incorporating long-chain branches.

The melt strength of a polymer can also be improved by blending it with high melt strength polymers without changing the polymer chemistry. Polylactic acid ("PLA") has high melt strength. However, one would expect, in a melt blend of PLA with 3GTX, that the acid groups on the PLA would lead to degradation of the 3GTX, specifically, a reduction in 3GTX chain length, thus molecular weight, thereby reducing the melt strength. It has now been surprisingly found that the melt strength of 3GTX polymer can be improved by blending it with PLA at certain ratios. It has further been found, as illustrated in the Examples below, that other desirable physical properties, such as puncture resistance, tear resistance, and drawability, are also improved by blending 3GTX with appropriate amounts of PLA. Adding PLA results in a melt strength that is at least about 1.5 times that of neat 3GTX, in some embodiments at least about 2.5 times that of neat 3GTX, and in some embodiments up to at least about 3.6 times that of neat 3GTX polymer.

In one embodiment, the melt strength of the poly(trimethylene terephthalate-co-sebacate) is improved by blending with it between about 5 and about 35 weight percent polylactic acid, based on the combined weight of the poly(trimethylene terephthalate-co-sebacate) plus polylactic acid. In some embodiments, the amount of polyactic acid can be between and optionally include any two of the following values: 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, and 35, weight percent polylactic acid, based on the combined weight of the poly(trimethylene terephthalate-co-sebacate) plus polylactic acid. In an embodiment, the composition contains from about 10 to about 30 wt % PLA. Adding PLA both increases melt strength and increases Young's modulus, i.e., stiffens the material. This is taken into account when designing a composition that will have high enough melt strength and a Young's modulus suitable for the particular end use. Young's modulus is generally below 150 MPa for flexible packaging and generally above 400 MPa for rigid packaging.

Commercially available chain extenders, such as are used to reverse the degradation of PET, polycarbonate, polyamides, and other condensation polymers, are added during melt processing to further increase melt strength. Chain extenders are typically linear, difunctional molecules whose end groups react quickly with polymer end groups, thereby coupling polymer chains, preferably without producing byproducts. Chain extenders for polyesters include, for example, diepoxides, bis(oxazolines), diisocyanates, and anhydrides. In one embodiment, adding a chain extender such as an oligomeric epoxy-containing resin (e.g., JONCRYL® ADR-4368, BASF Corporation, Florham Park, N.J.) as well as PLA can increase melt strength over using PLA alone. In some embodiments, the amount of chain extender can be between and optionally include any two of the following values: 0.01, 0.02, 0.03, 0.04, 0.05, 0.06, 0.07, 0.08, 0.09, and 0.10 wt %, based on the weight of the 3GTX plus PLA plus oligomeric epoxy-containing chain extender. In an embodiment, the chain extender is an oligomeric epoxy-containing chain extender and the amount is 0.04, 0.05, or 0.06 wt %.

Additionally, the rate of crystallization and the strain hardening parameters can be adjusted to an extent by incorporating nucleating agents during polymerization or processing of the copolyesters to accelerate their crystallization rates and to provide sufficiently high degree of molecular orientation during the film stretching process leading to improvement in the mechanical properties (Ramesh M Gohil, *Polymer Engineering and Science*, 49(3), p. 544, 2009). For injection molding of parts and articles, the presence of nucleating agents helps to increase the rate of crystallization at relatively high temperature so that productivity is enhanced. Particularly suitable nucleating agents include sodium salts of carboxylic acids and polymeric ionomers partially or fully neutralized with sodium cations. If incorporated during polymerization, lower molecular weight sodium salts are typically used and can be added with the monomers or later in the process, such as after completion of the interchange step and before or during the polycondensation step. If compounded into a finished copolyester, higher molecular weight sodium salts and the polymeric ionomers are typically used and can be added during mechanical extrusion with sufficient mixing. Specific examples of desirable nucleating agents include: sodium acetate, sodium acetate trihydrate, sodium formate, sodium bicarbonate, sodium benzoate, monosodium terephthalate, sodium stearate, sodium erucate, sodium montanate (e.g., Licomont® NaV 101, made by Clariant International, Ltd., Muttenz, Switzerland), DuPont™ Surlyn® sodium ionomers (ethylene-methacrylic acid sodium ionomers, made by E.I. du Pont de Nemours and Company, Wilmington, Del., USA) and AClyn® 285 (low molecular weight ethylene-acrylic acid sodium ionomer, Honeywell International, Inc., Morristown, N.J., USA). Such nucleating agents are typically used at levels that deliver 10 to 1000 ppm sodium with respect to the weight of the copolyesters.

Optional Additives

Depending on the intended end use of the material (e.g., films, fibers, molded parts), other additives, up to 10 wt %, can also be present in the compositions disclosed herein, particularly those that are commonly added to thermoplastic compositions. Such additives include delusterants (such as $TiO_2$, zinc sulfide or zinc oxide), colorants (such as dyes), pigments, fillers (e.g., nanoclays such as montmorillonite and sepiolite), lubricants, mold release agents, flame retardants, (paint) adhesion promoters, epoxy compounds, crystallization nucleation agents, plasticizers, antimicrobial agents, antistatic agents, optical brighteners, extenders, processing aids, heat stabilizers, UV stabilizers, slip agents, antiblock agents, and other functional additives (e.g., "chip additives"). The compositions disclosed herein can also be blended with other polymers, such as polyamides or polycarbonates.

$TiO_2$ or similar compounds (such as zinc sulfide and zinc oxide) are used as pigments or delusterants in amounts up to about 5 wt % or more (based on total composition weight) in fibers and larger amounts in some other end uses. When used in polymers for fibers and films, $TiO_2$ is added in an amount of preferably at least about 0.01 wt %, more preferably at least about 0.02 wt %, and preferably up to about 5 wt %, more preferably up to about 3 wt %, and most preferably up to about 2 wt % (based on total composition weight).

By "pigment" reference is made to those substances commonly referred to as pigments in the art. Pigments are substances, usually in the form of a dry powder, that impart color to the polymer or article. Pigments can be inorganic or organic, and can be natural or synthetic.

The other additives can be added to the compositions disclosed herein by conventional blending techniques well-known to those skilled in the art, e.g. compounding in a polymer extruder, melt-blending, or liquid injection.

Blend Preparation and Processing

The blend compositions disclosed herein can be prepared by conventional blending techniques well-known to those skilled in the art, preferably by melt-compounding. Usually, the polyester is dried before processing. The drying conditions are determined by the specific composition and are readily determined by one of ordinary skill in the art. One typical set of conditions is to dry the polyesters at 100-120° C. for 16 hours under partial vacuum with a small nitrogen flow.

The components of the blend composition are heated at a temperature sufficient to form a melt blend, but below the lowest decomposition temperature of the blend components.

A melt compounding process is used to prepare the blends, utilizing any known intensive mixing process, such as mixing in a HAAKE Rheocord Mixer (available from Thermo Fisher Scientific Inc., Waltham, Mass.) or Brabender® mixer (available from (C. W. Brabender® Instruments, Inc., South Hackensack, N.J.) or extrusion through a twin-screw extruder. Preferably, a twin-screw extruder is used. The ingredients are intimately mixed and fed to the mixer or extruder. Some ingredients can be co-fed or added at separate stages during the compounding or in a subsequent step.

Films prepared from the blends disclosed herein exhibit improved properties such as increased puncture and tear resistance. Film, sheet, and containers comprising the compositions disclosed herein exhibit good mechanical properties, can be made having a large proportion of renewably-sourced ingredients, and exhibit good biodegradability.

Uses

The compositions disclosed herein can be used in fibers, fabrics, films and other useful articles. Articles can be in the form of or comprise films, sheets, containers, membranes, laminates, pellets coatings, foams, fibers, yarns, or fabrics. In one embodiment, the article is a biaxially oriented film. In one embodiment, the article is a blown film. In another embodiment, the article is a cast film. In another embodiment, the article is an injection stretch blow molded bottle.

Articles can be prepared by any means known in the art, such as methods of injection molding, extrusion, coextrusion, film-blowing, blow-molding, injection stretch blow-molding, thermoforming, lamination, spinning, or any combination of these methods. Extruded articles include, for example, films, trash bags, grocery bags, container sealing films, pipes, drinking straws, spun-bonded non-woven materials, and sheets. Articles that can be made made from a profile extrusion formulation include, for example, drinking straws and pipes. Articles according to the present disclosure made from a thermoform extrusion method are, for example, sheets for producing cups, plates and other objects. In some embodiments, articles that can be made include packaging for food, waste, personal care (health and hygiene) items, and cosmetics. By "packaging" is meant either an entire package or a component of a package. Examples of packaging components include disposable trash bags, packaging films, liners, shrink bags, shrink wrap, trays, tray/container assemblies, replaceable and nonreplaceable caps, lids, and drink bottle necks.

The package can be in any form appropriate for the particular application, such as a can, box, bottle, jar, bag, cosmetics package, or closed-ended tube. The packaging can be fashioned by any means known in the art, such as extrusion, coextrusion, thermoforming, injection molding, lamination, or blow-molding. Some specific examples of packaging for personal care items and cosmetics include bottles, jars, and caps for food and for prescription and non-prescription capsules and pills, containers for solutions, creams, lotions, powders, shampoos, conditioners, deodorants, antiperspirants, and suspensions for eye, ear, nose, throat, vaginal, urinary tract, rectal, skin, and hair contact; and lip products.

The compositions disclosed herein can also be used, for example, for producing continuous and cut (e.g., staple) fibers, yarns, and knitted, woven and nonwoven textiles. The fibers can be monocomponent fibers or multicomponent (e.g., bicomponent) fibers, and can have many different shapes and forms. They are useful for textiles and flooring, including carpets, such as disclosed in U.S. Pat. No. 7,013,628.

EXAMPLES

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

The meaning of abbreviations is as follows: "cN" means centinewtons, "dL" means deciliter, "g" means gram(s), "kg" means kilogram(s), "mol" means mol(s), "IV" means intrinsic viscosity, "max draw" means maximum draw-down ratio, "MDI" means methylene-diphenyl diisocyanate, "MI" means melt index, "min" means minute(s), "mm" means millimeter(s), "$M_n$" means number average molecular weight, "mol" means mole(s), "MPa" means megapascal(s), "PDI" means polydispersity index (i.e., weight average molecular weight divided by number average molecular weight), "PLA" means polylactic acid, "ppm" means parts per million, "psi" means pounds per square inch, "in/min" means inches per min, "lb/h" means pounds per hour, "s" means second(s), "mol %" means mole percent, and "wt %" means weight percent(age).

Materials

JONCRYL™ ADR-4368 is an epoxy functional polymeric acrylic with the following physical characteristics: $M_n$<3,000; PDI>3; epoxy equivalent weight (EEW)=285 (+/−15 g/mol); and $T_g$=55° C. It was obtained in flake form from BASF Corporation (Florham Park, N.J.).

NatureWorks® PLA polymer 2002D was obtained from NatureWorks LLC (Minnetonka, Minn.)

Renewably sourced 1,3-propanediol (Bio-PDO™) was obtained from DuPont Tate & Lyle (Loudon, Tenn.).

Renewably sourced sebacic acid was obtained from NCeed Enterprises (Nazareth, Pa.).

Dimethyl terephthalate and methylene-diphenyl diisocyanate (MDI) were obtained from Sigma-Aldrich, St. Louis, Mo.

AClyn® 285, a low molecular weight ionomer adhesive, was obtained from Honeywell International, Inc. (Morristown, N.J.).

3GTX copolyester was prepared according to the procedure of International Application Number PCT/US09/67863, with 50 mol % of 1,3-propanediol, 24.7 mol % of dimethyl terephthalate, 25.3 mol % of sebacic acid, and 300 ppm Na of sodium acetate trihydrate. The polymer IV was about 1.276 dL/g and its MI was 5 g/10 min. The MI of the 3GTX was reduced to 2.6 by a reaction extrusion process conducted using a 30 mm twin-screw extruder. Barrel temperature set points were 160° C. Methylene-diphenyl diisocyanate (0.3 wt %) and 0.5 wt % AClyn® 285 were added to the polymer and introduced into the feed hopper of the extruder. Care was taken to keep the MDI dry before and as it was entering the extruder.

Methods

Intrinsic Visocity.

The intrinsic viscosity (IV) of the copolyesters was determined using a Viscotek Forced Flow Viscometer (FFV) Model Y-501C. The polymers were dissolved in 50/50 weight % trifluoroacetic acid/methylene chloride at a 0.4% (weight/volume) concentration at 19° C. A sample size of 0.1000 g polymer was typically used to prepare 25 mL of solution. The intrinsic viscosity values reported by this method were equivalent to values determined using Goodyear Method R-103B "Determination of Intrinsic Viscosity in 50/50 [by weight] Trifluoroacetic Acid/Dichloromethane".

Melt Strength.

The melt strength of the copolyesters was tested at 160° C. using a Göettfert Rheotens melt tensile tester. The melt was pushed through the orifice of a capillary extruder and wound up on a roll. The tension of the roll was recorded as the melt tension. The roll speed was increased until the strand broke. The breaking speed was ratioed with the calculated velocity of the polymer as it exited the orifice of the rheometer to obtain the maximum draw rate. It is important to note that results from one device may not correspond to those from another, since it is an empirical test. There can also be variation in the data because of operation nuances, air pockets (causing premature breaks), draw resonance, etc. Test conditions are presented in Table 1.

TABLE 1

Rheotens Melt Strength Test Parameters

| | Units | Value |
|---|---|---|
| Temperature of Test | °C. | 160 |
| Distance between die exit and pull off wheels | mm | 100 |
| Barrel Diameter (Db) | mm | 9.55 |
| Die Diameter | mm | 2 |
| Die length to diameter ratio (L/D) | | 15 |
| Die entrance angle | ° | 180 |
| Piston speed | mm/min | 6.35 |
| Initial wind up speed | mm/min | 1.5 |
| Acceleration | mm/s$^2$ | 0.24 |

Melt Index.

A 2 mm diameter die was placed into the barrel of a single-barrel extruder. The extruder barrel was preheated to 190° C. and the barrel outlet was capped with a metal rod to inhibit leakage. The extruder barrel was loaded with about 5-6 g of polymer. A piston was then inserted into the extruder barrel and the polymer and piston were allowed to equilibrate at 190° C. for 5 min. A standard 2.16 kg weight was then placed onto the piston and the metal rod was removed to allow the polymer to flow for 30 sec before taking 6-10 samples at 30-sec intervals. The samples were weighed after cooling and the average sample mass was used to calculate melt index.

Example 1

Melt Properties of 3GTX/PLA Compounded Blends

A pellet mixture that was 85 wt % 3GTX (170 g) and 15 wt % PLA (30 g) was dried overnight at 70° C. under partial vacuum with a small nitrogen purge. The dried mixture was extruded through a 1-hole, ⅛ inch (3.18 mm) die via a PRISM T20 bench top twin-screw extruder (Thermo Electron Corporation, Karlsruhe, Germany) at specified conditions (barrel 2 at 170° C., barrels 3, 4 and at 180° C., die at 170° C., screw RPM at 150, torque at 55, die press at 300° C., feed rate at 1.4 lb/h). The pellets of compounded polymer thereby produced were dried at 70° C. overnight under partial vacuum with low purge of nitrogen prior to melt strength and melt index measurements. A 1.8 g dried sample was hot-pressed in a 5-mil (0.127 mm) form for 3 min at 170° C. and 20,000 psi (138 MPa) for evaluation of tensile properties at a stretching rate of 5 in/min.

As shown in Table 2, 3GTX melt properties were improved by adding 5-50 wt % PLA. The blends exhibited higher melt tension, higher max draw, and higher melt strength than would be predicted by calculated weight averages.

TABLE 2

| Wt % 3GTX | Wt % PLA | MI (g/10 min) | Melt Tension (cN) | | Max Draw | | Melt strength (cN) | |
|---|---|---|---|---|---|---|---|---|
| | | | Calcd. Wt. Average | Observed | Calcd. Wt. Average | Observed | Calcd. Wt. Average | Observed |
| 0 | 100 | 3.6 | 11 | 11 | 220.0 | 220.0 | 2420.0 | 2420.0 |
| 100 | 0 | 2.6 | 6.4 | 6.4 | 60.8 | 60.8 | 389.1 | 389.1 |
| 98 | 2 | 2.2 | 6.5 | 6.8 | 64.0 | 60.9 | 429.7 | 413.8 |
| 95 | 5 | 2.3 | 6.6 | 7.8 | 68.8 | 101.4 | 490.6 | 790.9 |
| 90 | 10 | 3.8 | 6.9 | 7.7 | 76.7 | 147.1 | 592.2 | 1132.7 |
| 85 | 15 | 3.9 | 7.1 | 8.2 | 84.7 | 159.8 | 693.7 | 1310.4 |
| 80 | 20 | 4.0 | 7.3 | 8.4 | 92.6 | 129.3 | 795.3 | 1086.1 |
| 70 | 30 | 3.0 | 7.8 | 9.3 | 108.6 | 147.1 | 998.3 | 1368.0 |
| 50 | 50 | 3.3 | 8.7 | 10.3 | 140.4 | 175.0 | 1404.6 | 1802.3 |

Example 2

Melt Properties of 3GTX Blended with PLA and Epoxy

JONCRYL® ADR-4368 (from BASF) is a solid, oligomeric epoxy-containing chain extender. JONCRYL ADR-4368 was compounded at a level of 0.1 wt % with 20 wt % PLA and 79.9 wt % 3GTX at 180° C. Melt properties are presented in Table 3.

TABLE 3

| Samples | MI (g/10 min) | Melt tension (cN) | Max Draw | Melt strength (cN) |
|---|---|---|---|---|
| PLA 2002D | 3.6 | 11 | 220.0 | 2420.0 |
| 3GTX | 2.6 | 6.4 | 60.8 | 389.1 |
| 20% PLA + 80% 3GTX | 4.0 | 8.4 | 129.3 | 1086.1 |
| 20% PLA + 79.9% 3GTX + 0.1% Joncryl | 2.2 | 9.8 | 157.3 | 1541.7 |

What is claimed is:

1. A blend comprising 65-95 wt % poly(trimethylene terephthalate-co-sebacate), 5-35 wt % polylactic acid, and 0.01-0.10 wt % chain-extender, wherein the weight percents are based on the combined weight of the poly(trimethylene terephthalate-co-sebacate), polylactic acid, and chain extender, wherein the poly(trimethylene terephthalate-co-sebacate) is represented by

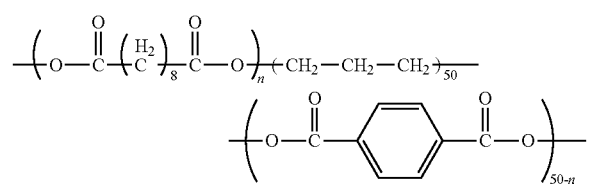

wherein n is about 1 to about 49.

2. The blend of claim 1, wherein n is about 20 to about 30.

3. The blend of claim 1, wherein the chain extender is an oligomeric epoxy-containing chain extender.

4. The blend of claim 1, wherein the amount of the chain extender is 0.04-0.1 wt %.

5. The blend of claim 1, further comprising a nucleating agent.

6. The blend of claim 5, wherein the nucleating agent comprises sodium acetate, sodium acetate trihydrate, sodium formate, sodium bicarbonate, sodium benzoate, monosodium terephthalate, sodium stearate, sodium erucate, sodium montanate, an ethylene-methacrylic acid sodium ionomers, or an ethylene-acrylic acid sodium ionomer.

* * * * *